United States Patent [19]

Daniel et al.

[11] Patent Number: 6,061,023

[45] Date of Patent: May 9, 2000

[54] METHOD AND APPARATUS FOR PRODUCING WIDE NULL ANTENNA PATTERNS

[75] Inventors: Sam Mordochai Daniel, Tempe; Stephen Chih-Hung Ma, Mesa; Keith Vaclav Warble, Chandler, all of Ariz.; Shao-Wei Pan, Lake Zurich; Shay-Ping Thomas Wang, Long Grove, both of Ill.

[73] Assignee: Motorola, Inc., Schaumburg, Ill.

[21] Appl. No.: 08/963,485

[22] Filed: Nov. 3, 1997

[51] Int. Cl.[7] .............................. H04R 7/185; H01Q 3/22

[52] U.S. Cl. ......................... 343/354; 342/373; 342/378

[58] Field of Search ................................... 342/383, 378, 342/373, 354

[56] References Cited

U.S. PATENT DOCUMENTS

| | | | |
|---|---|---|---|
| 4,225,870 | 9/1980 | Marner et al. | 343/854 |
| 4,246,585 | 1/1981 | Mailloux | 342/373 |
| 4,933,680 | 6/1990 | Shapiro et al. | 343/700 MS |
| 5,034,752 | 7/1991 | Pourailly et al. | 342/373 |
| 5,343,211 | 8/1994 | Kott | 342/379 |
| 5,396,256 | 3/1995 | Chiba et al. | 342/372 |
| 5,495,258 | 2/1996 | Muhlhauser et al. | 343/753 |
| 5,504,493 | 4/1996 | Hirshfield | 342/372 |
| 5,515,060 | 5/1996 | Hussain et al. | 342/376 |
| 5,579,016 | 11/1996 | Wolcott et al. | 342/378 |
| 5,585,803 | 12/1996 | Miura et al. | 342/372 |
| 5,594,941 | 1/1997 | Dent | 455/13.4 |
| 5,642,122 | 6/1997 | Lockie et al. | 343/881 |
| 5,754,138 | 5/1998 | Turcotte et al. | 342/373 |

FOREIGN PATENT DOCUMENTS

| | | | |
|---|---|---|---|
| 2318915 | 6/1998 | United Kingdom | H01Q 3/26 |
| 9409568 | 4/1994 | WIPO | H04B 1/10 |
| 9700543 | 1/1997 | WIPO | H01Q 25/00 |

OTHER PUBLICATIONS

J. Litva, T. Lo, "Digital Beamforming in Wireless Communications", Artech House, Inc., 1996, Chapters 8 and 9.

S. Applebaum, "Adaptive Arrays", IEEE Transactions on Antennas and Propagation, vol. AP–24, No. 5, Sep. 1976, pp. 585–598.

H. Steyskal, "Digital Beamforming Antennas An Introduction", Microwave Journal, Jan. 1987, pp. 107,108,110,112, 114,116,118,120,122,124.

Article entitled "Transmitting Null Beam Forming With Beam Space Adaptive Array Antennas" by Isamu Chiba et al. in IEEE (1994).

Article entitled "An Adaptive Antenna for Rejection of Wideband Interference" by Kazuaki Tokyo and Koji Komiyama in IEEE Transactions on Aerospace and Electronic Systems vol. AES–16 (1980).

(List continued on next page.)

*Primary Examiner*—Gregory C. Issing
*Attorney, Agent, or Firm*—Walter W. Nielson; James F. Klekotka

[57] ABSTRACT

An enhanced digital beamformer (EDBF) (210, FIG. 2) is provided for use in a transceiver subsystem (200, FIG. 2) for mitigating interference and increasing the frequency reuse factor in communication systems. The EDBF is used to produce wide nulls (520, FIG. 5) in at least one steerable antenna beam pattern. By directing wide nulls at undesired signals, the EDBF provides a more efficient processing of antenna beam patterns in communication systems. The EDBF is used in geostationary satellites, non-geostationary satellites, and terrestrial communication devices. The EDBF combines a unique algorithm, a special processor, and an array antenna to significantly improve the capacity of current and future communication systems, while remaining compatible with existing modulation techniques.

9 Claims, 5 Drawing Sheets

OTHER PUBLICATIONS

Craig et al, "Digital Signal Processing in Communications Satellite Payloads", Electronics & Communication Engineering Journal, Jun. 1992.

Gebauer et al, "Channel–Individual Adaptive Beamforming for Mobile Satellite Communications" IEEE Journal on Selected Areas in Communications, vol. 13, No. 2, Feb. 1995.

Gao et al, "Wide Null and Low Sidelobe Pattern Synthesis for Phased Array Antennas", APMC' p3 vol. 1/p 1–42—1–45, 1993.

METHOD AND APPARATUS FOR PRODUCING WIDE NULL ANTENNA PATTERNS

CROSS-REFERENCE TO RELATED INVENTIONS

The present invention is related to the following co-pending United States patent inventions which are assigned to the same assignee as the present invention:

(1) "Logarithm/Inverse-Logarithm Converter Utilizing Linear Interpolation And Method Of Using Same", having Ser. No. 08/391,880, filed on Feb. 22, 1995 now U.S. Pat. No. 5,600,581;

(2) "Logarithm/Inverse-Logarithm Converter Utilizing A Truncated Taylor Series And Method Of Use Thereof", having Ser. No. 08/381,167, filed on Jan. 31, 1995 now U.S. Pat. No. 5,604,691;

(3) "Logarithm/Inverse-Logarithm Converter And Method Of Using Same", having Ser. No. 08/381,368, filed on Jan. 31, 1995 now U.S. Pat. No. 5,642,305;

(4) "Logarithm/Inverse-Logarithm Converter Utilizing Second-Order Term And Method Of Using Same", having Ser. No. 08/382,467, filed on Jan. 31, 1995 now U.S. Pat. No. 5,703,801;

(5) "Method And System For Digital Beam Forming", having Ser. No. 08/654,946, filed on May 29, 1996;

(6) "Method And Intelligent Digital Beam Forming System With Improved Signal Quality Communications", having Ser. No. 08/739,645, filed on Oct. 30, 1996 now U.S. Pat. No. 5,856,804;

(7) "Method And Intelligent Digital Beam Forming System For Interference Mitigation", having Ser. No. 08/739,528, filed on Oct. 30, 1996 now U.S. Pat. No. 5,754,138; and (8) "Method And Intelligent Digital Beam Forming System Responsive To Traffic Demand", having Ser. No. 08/739,529, filed on Oct. 30, 1996 now U.S. Pat. No. 5,754,139.

The subject matter of the above-identified related inventions is hereby incorporated by reference into the disclosure of this invention.

FIELD OF THE INVENTION

This invention relates generally to phased array antennas and, more particularly, to a method and apparatus for producing wide null antenna patterns using digital beam forming.

BACKGROUND OF THE INVENTION

The capacity of a conventional multi-beam satellite or terrestrial communication system is often limited by its frequency-reuse or code-reuse capability. In such systems, the level of frequency domain channelization or code assignment over a collection of simultaneous beams is dictated by the angular separation between beams. Angular separation is needed to reduce co-channel interference through beam pattern sidelobes. The number of distinct frequency channels and code assignments over the beams is known as the frequency or code-reuse factor.

For example, a satellite communication system may employ a 12-channel or 12-code reuse scheme to realize angular separation among identical channel beams. This is done to guarantee sufficient channel rejection. This reuse level is accomplished through a 12-cell reuse configuration. As a consequence, each beam in a 12-beam configuration is capable of delivering $1/12$ of the potential capacity. Achieving greater system capacity or realizing a reuse factor much lower than 12 is difficult in conventional systems because the interference produced by competing users can be rather high.

Satellite communication systems have used phased array antennas to communicate with multiple users through multiple antenna beams. Typically, efficient bandwidth modulation techniques are combined with multiple access techniques, and frequency separation methods are employed to increase the number of users. Because electronic environments are becoming increasingly dense, more sophistication is required for wireless communication systems. For example, with all users competing for a limited frequency spectrum, the mitigation of interference among various systems is a key to the allocation of the spectrum to the various systems.

Beam steering and nulling systems have been developed mostly by the military for communications and radar operations. However, such systems have been capable of only a small number of beams and a limited number of narrow nulls. One reason for these limitations is the prohibitively high computational cost of the underlying signal processing.

There is a need for a method and apparatus to increase the frequency reuse factor in communication systems. There is also a significant need for methods and apparatus for providing more efficient processing of antenna beam patterns in a communication system. In addition, these needs are especially significant for satellite communication systems which include non-geostationary satellites and geostationary satellites.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

DETAILED DESCRIPTION OF A PREFERRED EMBODIMENT

The present invention provides a method and apparatus which increase the frequency and code reuse factor in communication systems. The method and apparatus of the invention also provide more efficient processing of antenna beam patterns in communication systems. In addition, the method and apparatus of the invention are especially significant for use with non-geostationary satellites in satellite communication systems. The invention combines an enhanced digital beamforming algorithm with a digital signal processor (DSP) based system to significantly improve the capacity of current and future communication systems, while remaining compatible with existing modulation techniques. In the invention, standard digital beamforming techniques are enhanced by, among other things, replacing a single null with a cluster of nulls.

Figure 1:
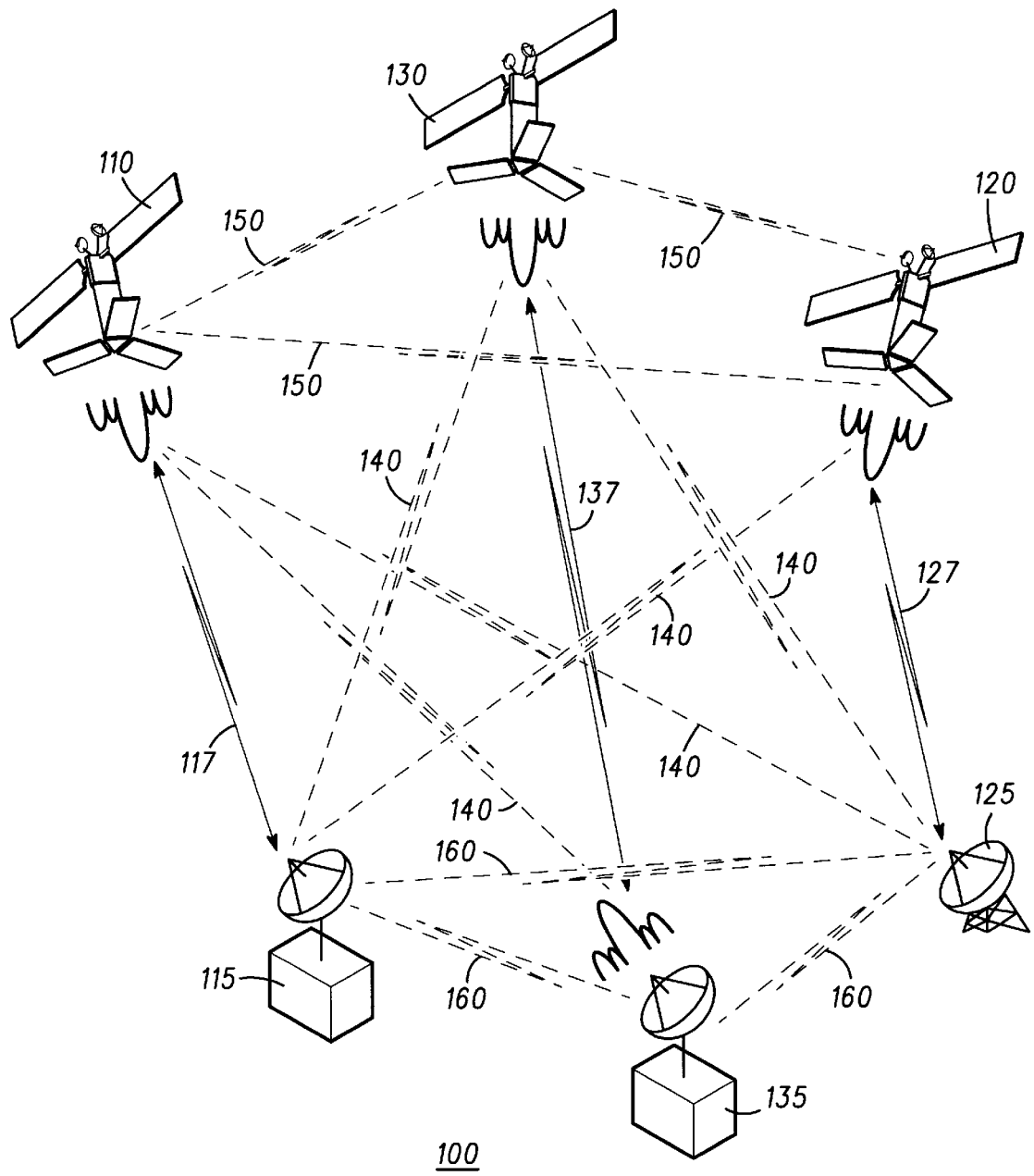
FIG. 1 shows a simplified block diagram of a satellite communication system within which the methods and apparatus of the invention can be practiced.

FIG. 1 shows a simplified block diagram of a satellite communication system within which the method and apparatus of the invention can be practiced. FIG. 1 illustrates three satellites 110, 120, and 130 with digital beamformers in a typical spectrum sharing scenario. As illustrated, there are several communication paths between satellites 110, 120, and 130 and 30 terrestrial-based communication devices 115, 125, and 135. A link can be established, as shown by desired signal path 117, between satellite 110 and terrestrial-based communication device 115. A desired signal path 127 exists between satellite 120 and terrestrial-based communication device 125. In addition, another desired signal path 137 exists between satellite 130 and terrestrial-based communication device 135.

Satellites 110, 120, and 130 can reside in geostationary or non-geostationary orbits. In geostationary orbits, satellites remain relatively stationary to any given point on the surface of the earth. In non-geostationary orbits, satellites can move at high speed relative to any given point on the surface of the earth. In non-geostationary orbits, satellites can also move at high speed relative to a satellite in a geostationary orbit. This means that these satellites can come into view at various times with respect to a geo-stationary satellite and/or a point on the surface of the earth. Terrestrial-based communication devices 115, 125, and 135 are located proximate to the surface of the earth.

When two or more communication paths occupy a common segment of the frequency spectrum, interference between two or more communication channels within these paths can occur. Interference paths are a problem in most communication systems. Undesired signal paths 140 exist between satellites 110, 120, and 130 and terrestrial-based communication devices 115, 125, and 135. Also, undesired signal paths 150 exist between satellites 110, 120, and 130, and undesired signal paths 160 exist between terrestrial-based communication devices 115, 125, and 135.

Satellites 110, 120, and 130 desirably employ enhanced digital beamformers (EDBF). In addition, terrestrial-based communication devices 115, 125, and 135 desirably employ enhanced digital beamformers. Satellites 110, 120, and 130 and terrestrial-based communication devices 115, 125, and 135 can be viewed as nodes in satellite communication system 100. The below-discussed features of a preferred embodiment of the invention can be practiced at any node of satellite communication system 100 or any node of other radio frequency (RF) communications systems.

Terrestrial-based communication devices 115, 125, and 135 communicate with communication satellites 110, 120, and 130 using RF communication links established in desired signal directions as shown by desired signal paths 117, 127, and 137. Terrestrial-based communication devices 115, 125, and 135 communicate with other terrestrial-based communication devices like communication devices 115, 125, and 135 using terrestrial-based links (not shown). Satellites 110, 120, and 130 communicate with other satellites like satellites 110, 120, and 130 using cross-links (not shown).

In a receive mode, the receiver portion of the enhanced digital beamformer configures the antenna beams of a satellite to desirably point its main communication beam at a particular terrestrial-based communication device while preferably providing wide nulls in the antenna's receive pattern in the direction of any interfering signal transmitters. Accordingly, any interference received on an undesired signal path is significantly reduced. Preferably, a wide null in a receiver antenna pattern of a satellite is directed toward and tracks every interfering signal which is transmitted within the field of view of that satellite.

To accomplish this, control matrices for the enhanced digital beamformers are periodically adjusted to maintain the nulls in the directions of the interfering signal transmitters as the satellite and/or the interfering signal transmitters move. Accordingly, the receive mode wide nulls are dynamically controlled without using a continuous update strategy. Wide nulls allow the update rate to be relaxed from a continuous to a periodic update rate.

In the transmit mode, the transmitter portion of the enhanced digital beamformer configures the antenna beams of a satellite to desirably point its main communication beam at a particular terrestrial-based communication device while preferably providing wide nulls in the transmitted antenna pattern in the direction of any known interfering signal receivers. Accordingly, any signal energy which can be received by the interfering signal receiver on an undesired signal path is significantly reduced. Preferably, a wide null in the antenna's transmit pattern is directed toward and tracks every interfering signal receiver which is within the field of view of that satellite.

To accomplish this, control matrices for the enhanced digital beamformers are periodically adjusted to maintain the nulls substantially in the directions of the interfering signal receivers as the satellite and/or the interfering signal receivers move. In addition, transmit mode wide nulls are also dynamically controlled without using a continuous update strategy. Establishing wide nulls in the transmit mode allows the update rate to be relaxed from a continuous to a periodic update rate.

In a preferred embodiment, wide nulls are placed in any antenna pattern directed towards interfering signal transmitters or receivers. Typically, communication channels are established between two nodes in an RF communication system only when a line-of-sight path exists between two nodes. For mobile nodes, a field of view is established. In the case of a satellite to ground communication channel, the center of the field of view generally occurs when the satellite is overhead.

Accordingly, any or all wide nulls in the transmit and receive antenna patterns of a node may be turned on and turned off in accordance with other nodes. The positioning of a wide null in the receive and transmit antenna patterns of an RF communication device (node) allows two or more communication systems to more efficiently share spectrum. In a preferred embodiment of the invention, transmit and receive nulls are placed in similar directions.

The enhanced digital beamformer, when employed in terrestrial-based communication devices 115, 125, and 135, desirably adjusts its transmit and receive antenna beam characteristics to point its primary antenna beam at the desired satellite while directing a wide null in the direction of an interfering signal. The direction of arrival can be determined using, among other things, information associated with the terrestrial-based communication device's location.

The enhanced digital beamformer, when employed in satellites 110, 120, and 130, desirably adjusts its transmit and receive antenna beam characteristics to point its primary antenna beam at the desired terrestrial-based communication device while directing a wide null in the direction of other interfering terrestrial-based communication devices. A direction of arrival can be determined using, among other things, information associated with a satellite's location.

Figure 2:
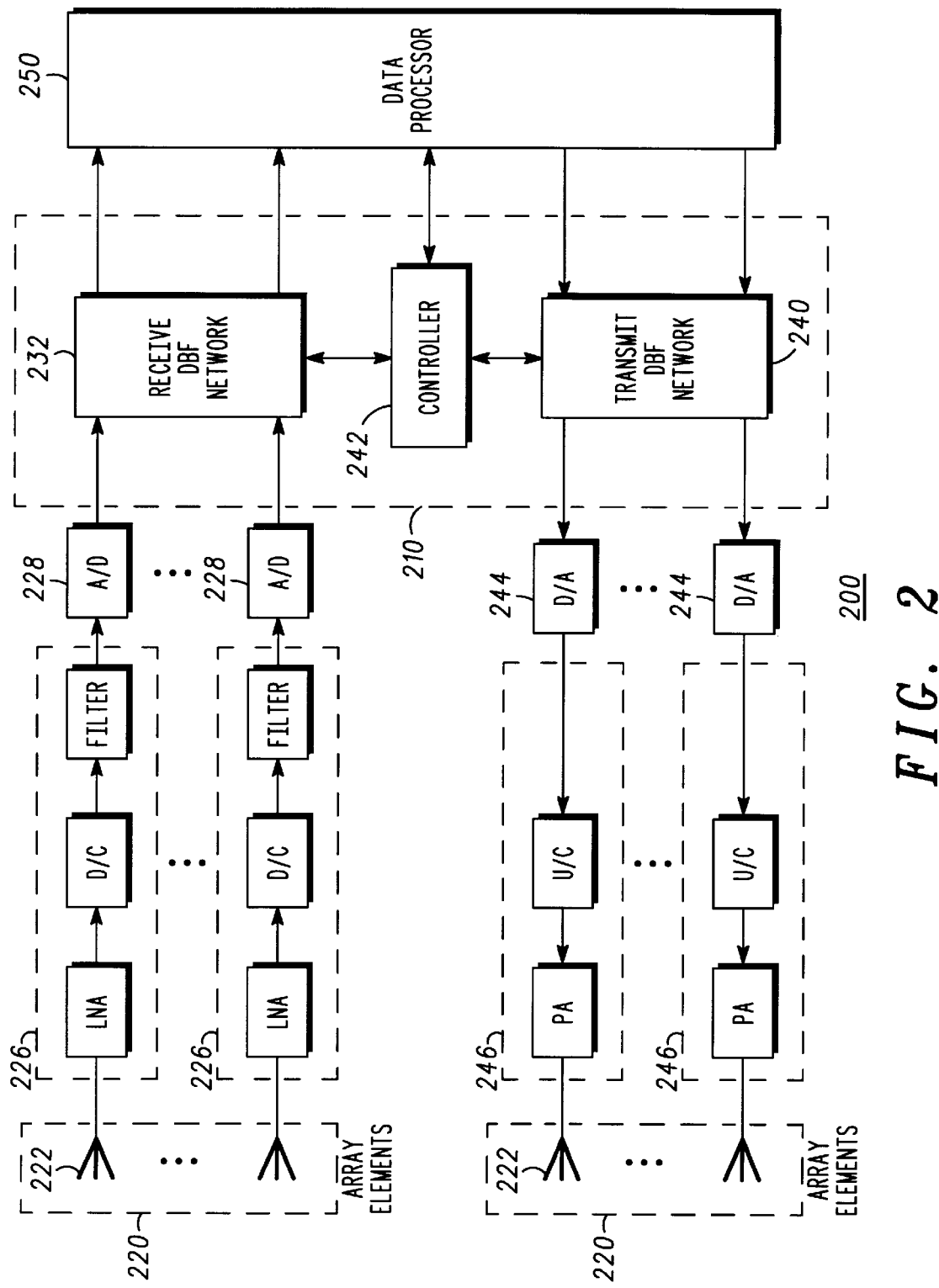
FIG. 2 shows a simplified block diagram of a transceiver subsystem which includes an enhanced digital beamformer in accordance with a preferred embodiment of the invention.

FIG. 2 shows a simplified block diagram of a transceiver subsystem which includes an enhanced digital beamformer in accordance with a preferred embodiment of the invention. Transceiver subsystem 200 includes array-antenna 220, a plurality of receiver modules 226, a plurality of analog-to-digital (A/D) converters 228, a plurality of digital-to-analog (D/A) converters 244, a plurality of transmitter modules 246, data processor 250, and enhanced digital beamformer 210. Enhanced digital beamformer 210 includes a receive digital beamforming (RDBF) network 232, transmit digital beamforming (TDBF) network 240, and controller 242.

Enhanced digital beamformer 210 implements beam steering and control functions necessary to form antenna beam patterns with the desired characteristics. Digital data from RDBF network 232 is sent to data processor 250. TDBF network 240 obtains digital data from data processor. Digital data includes data for transmission as well as data for control.

Array-antenna 220 includes elements 222 preferably arranged in a linear two-dimensional array; however, other array configurations are suitable. Received radio frequency (RF) signals are detected and digitized at the element level.

In response to received signals, receiver modules 226 generate analog baseband signals. Receiver modules 226 perform the functions of frequency down-conversion, filtering, and amplification to a power level commensurate with A/D converters 228. Analog baseband signals are converted to digital data using in-phase (I) and quadrature (Q) A/D converters. The I and Q components respectively represent real and imaginary parts of the complex analog signal envelope. There is preferably a one-to-one correspondence between elements 222 and receiver modules 226.

A/D converters 228 sample and digitize analog baseband signals to produce digital I and Q signals. Each A/D converter is preferably dedicated to processing signals produced by its respective array element. After the A/D conversion, the digital I and Q signals are processed by RDBF network 232.

Gains in capacity, reduced interference, and improved performance can be achieved through the use of EDBF with an array antenna. Typically, digital beamforming refers to the creation of multiple, simultaneous, independently controlled beams at baseband, which are controlled through digital signal processing. Digital beamforming implementations are described in the co-pending U.S. patent applications of above-identified Related Inventions Nos. 5–8.

With an enhanced digital beamforming capability, a communication system can employ a resource allocation policy which assigns beams to sources to optimize total capacity and quality of service. Beams are designed to have beam-widths and null widths which vary according to traffic density. Frequency assignment and EDBF techniques are used to minimize co-channel interference.

In a preferred embodiment, array antennas consisting of many controllable receiving/transmitting elements are used with enhanced digital beamforming techniques. The beam pattern from an array can be steered by applying linear phase weighting across the array. The array's pattern can be shaped by amplitude and phase weighting the outputs of the individual elements.

Weight values, in matrix form, are passed to RDBF network 232 by controller 242. Using a suitable algorithm, RDBF network 232 adaptively determines the proper weights for each radiating element 222. This can be done at a relatively slow rate compared to the overall data throughput of the antenna system. Controller 242 performs procedures and processes discussed below at a rate dependent on system dynamics.

RDBF network 232 provides digital I and Q signals, which represent signals received from each radiating element 222, to data processor 250. The digital signals include in-phase (I) and quadrature (Q) information which represents amplitude and phase information for signals received by each element. Data processor 250 converts this digital I and Q data for use by other subsystems.

Data processor 250 provides digital data to TDBF network 240 and controller 242. Controller 242 provides transmit beam weights, in matrix form, to TDBF network 240. Using a suitable algorithm, TDBF network 240 adaptively determines the proper weights for each radiating element 222. Preferably, a transmit beam weight is provided to correspond with each transmit radiating element 222 of array-antenna 220. Using procedures as discussed below, controller 242 adaptively determines the proper weights for both transmit and receive processes.

D/A converters 244 convert the digital output signals for each radiating element of TDBF network 240 into corresponding analog signals for each radiating element 222. Transmitter modules 246 generate signals suitable for transmission by radiating elements 222. Preferably, transmitter modules 246 perform the functions of frequency up-conversion, filtering, and amplification.

Transceiver subsystem 200 shown in FIG. 2 has advantages over conventional systems with fixed beam antennas because it, among other things, adaptively adjusts beam patterns and produces wide nulls in response to interference data. In addition, transceiver subsystem 200 provides antenna beam patterns in response to demand for communication services, and it provides improved nulling of unwanted RF signals. These features are implemented through appropriate software embedded in controller 242 and data processor 250.

Data processor 250 can be implemented using one or more processors. Data processor 250 stores data that serve as its instructions and that, when executed by data processor 250, cause transceiver subsystem 200 to carry out procedures which are discussed below.

Data processor 250 provides management and control functions. Data processor 250 preferably also provides for the allocation of frequency and time-slot assignments for links between transceiver subsystems 200.

Controller 242 can also be implemented using one or more parallel processors. Controller 242 also stores data that serve as its instructions and that, when executed by controller 242, cause enhanced digital beamformer 210 to carry out procedures which are discussed below. Controller 242 can also be implemented using digital signal processors. Controller 242 can be implemented using special processors which can include logarithm converters, inverse logarithm converters, and parallel processors.

In a preferred embodiment, a number of enhanced digital beamformers 210 are used in transceiver subsystem 200.

Transceiver subsystem 200 is incorporated into at least one Low Earth Orbit (LEO) satellite in communication system 100 (FIG. 1). However, the invention is applicable to systems including satellites having low-earth, medium-earth or high-earth orbits, or to systems including satellites at different altitudes. Additionally, it is applicable to orbits having any angle of inclination. Those skilled in the art will appreciate that many different structures can be useful in transceiver subsystem 200 and enhanced digital beamformer 210.

In a preferred embodiment, a number of enhanced digital beamformers 210 are also used in terrestrial-based communication devices. As more and more satellites are put into service, terrestrial-based communication devices are required to operate in an increasingly dense interference environment. In some cases, the satellites are part of the same communication system, and in other cases, the satellites are part of a different communication system.

Standard digital beamforming is effective in increasing the isolation among the beams beyond that of the sidelobe structure, because of narrow nulls. Typically, each formed beam can exhibit a single null toward the prescribed look direction of an interfering beam. However, standard digital beamforming is limited when considered with respect to its sensitivity to pointing errors, bandwidth, and orbit dynamics, particularly in the context of sticky beams. Sticky beams are beams which have an endpoint which remains substantially fixed on the earth's surface while the satellite moves overhead. When the assigned beam directions deviate from the actual beam directions, the sharp nulls do not coincide with the actual directions. This occurs because the assigned beam directions are no longer centered with respect to the beams. As a consequence, standard digital beamforming provides marginal benefit.

In a preferred embodiment, the limited effectiveness of the narrow nulls of standard beamforming is eliminated by enhancing the underlying algorithm to produce wider nulls. These wider nulls are, in some cases, a substantial fraction of a beamwidth, and they are wider in other cases. The resultant enhanced digital beamforming technique is more tolerant of beam pointing, scanning, and bandwidth related errors.

One algorithm which has been used in the standard DBF application is a best linear unbiased estimator (BLUE). This algorithm adjusts the weight coefficients of the array to achieve a minimum variance in a desired signal estimate. The BLUE algorithm forces deep nulls in the direction of all other users for each beam, and therefore, it is susceptible to pointing errors. EDBF techniques can be used with the BLUE algorithm to increase its effectiveness.

An enhanced digital beamforming algorithm is formulated below for a linear antenna array. Given a set of desired look directions, a complex-valued transformation matrix T is derived whose rows are weights over the antenna elements. In a preferred embodiment of the present invention, a T matrix is optimized to produce beams along the desired directions while exhibiting mutual wide nulls among them. In this case, information about the angles of arrival (AOA) of the distinct signals is available.

Beam look directions correspond to estimates of the AOAs which are provided to the system. When the AOAs are accurate, any given beam receives primarily its own desired signal, while all other signals are nulled out maximally by the formed wide nulls. However, when AOAs are not exact, the corresponding beams and nulls will be displaced. As a consequence, the desired signals lose a small amount of signal level.

Figure 3:
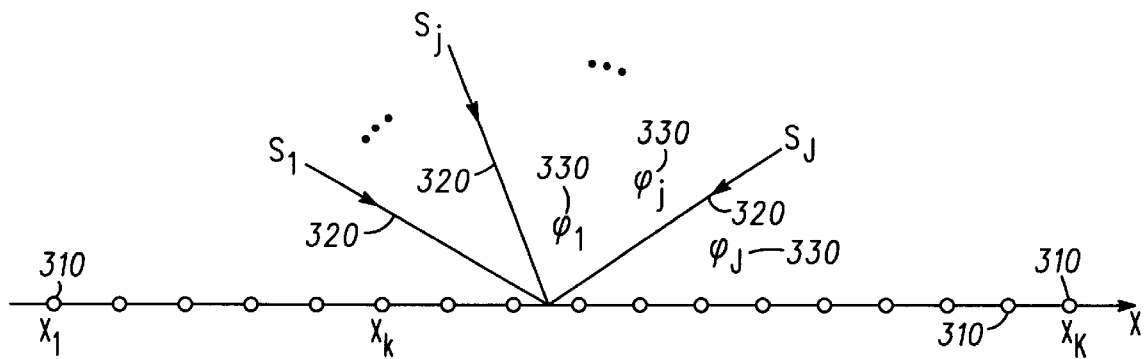
FIG. 3 illustrates a linear array of K omni-directional antenna elements and J incident plane waves from different sources.

FIG. 3 illustrates a linear array of K omni-directional antenna elements and J incident plane waves from different sources. The sources are receivers in one case and transmitters in another case. Receivers and transmitters can be desired signal sources and/or undesired signal sources. For simplicity of illustration, a single frequency of operation f is assumed, and there is a uniform element spacing of one-half wavelength, $\lambda/2$.

Define x to be a real-valued vector of K antenna element locations 310 uniformly spaced at unit intervals of $\lambda/2$ units along the x-axis. Also, let s represent the complex envelopes of the J incident plane waves 320, and $\phi$ be the corresponding angles of arrival 330. In other words, let $$x = \{x_k\}_{k=1}^{K} \quad (1)$$

$$s = \{s_j\}_{j=1}^{J}$$

$$\varphi = \{\varphi_j\}_{j=1}^{J}$$

be the set of equations which defines the antenna location vector, the incident signal vector, and the angle of arrival vector, respectively. Then, the received signal vector $\tilde{r}$ over the K antenna elements is of the form $$\tilde{r} = As + n \quad (2)$$

where A is the K×J complex-valued steering matrix whose columns are the steering vectors corresponding to the angles of arrival, the components of $\phi$, and n is a zero-mean additive noise vector. Specifically, $$A = \{a^j\}_{j=1}^{J} = \{\{e^{j\pi x_k \cos\varphi_j}\}_{k=1}^{K}\}_{j=1}^{J} \quad (3)$$

where, $a^j$ is the j-th steering vector. It represents the phase shading, over the K antenna elements, due to the plane wave signal incident at angle $\phi_j$.

An objective of digital beamforming is to derive a transformation matrix T which will operate on the received signal vector $\tilde{r}$ to yield an optimal estimate of incident signal vector s. In other words, given r, an estimate of s that satisfies an appropriate criterion of optimality must be obtained. Specifically, a suitable estimate $\hat{s}$ is that value of s which will minimize the metric $$E(s) = \|R_{nn}^{-\frac{1}{2}}(As - \tilde{r})\|^2. \quad (4)$$

Setting the gradient of (4) to zero $$\nabla_s E(s) = A^{*T} R_{nn}^{-1}(As - \tilde{r}) = 0 \quad (5)$$

yields the desired estimate $$\hat{s} = (A^{*T} R_{nn}^{-1} A)^{-1} A^{*T} R_{nn}^{-1} \tilde{r} \quad (6)$$

where, defining the J×K transformation matrix as $$T = (A^{*T} R_{nn}^{-1} A)^{-1} A^{*T} R_{nn}^{-1} \quad (7)$$

yields $$\hat{s} = T\tilde{r}, \quad (8)$$

the optimal estimate of the incident signal vector. The estimate in (6) is sometimes referred to as the Best Linear Unbiased Estimator (BLUE). In this case, best refers to optimal; linear indicates that the estimate involves a linear operator as seen in (8), and unbiased underlines the fact that the error metric (4) is normalized by the noise covariance.

When the noise vector components, which are associated with the antenna elements, are assumed to be statistically independent, zero-mean, and of equal-variance, $\sigma_n^2$, the noise covariance matrix becomes $$R_{nn} = \sigma_n^2 I \qquad (9)$$

and, by (6), the transformation matrix simplifies to $$T = (A^{*T}A)^{-1} A^{*T}. \qquad (10)$$

This leads to $$\begin{aligned}\hat{s} &= T\tilde{r} \\ &= (A^{*T}A)^{-1} A^{*T}(As+n) \\ &= s + Tn\end{aligned} \qquad (11)$$

which indicates that the error in the estimate, ŝ is Tn. The relative magnitude of this estimation error clearly relates to the quality of the estimate. Under appropriate statistical assumptions, such as the assumption that rows in T do not correlate with n, it can be shown that the estimated signal is given by the approximation $$\hat{s} = s + \frac{n}{\sqrt{K}} \qquad (12)$$

Significantly, in the absence of noise, the estimate ŝ is identical to the actual incident signal vector s. In view of (2) and (8), this leads to $$s = Tr, \qquad (13)$$

where r is the noiseless version of the received signal vector $\tilde{r}$. Clearly, T acts like a filter able to extract the incident signal vector s from the received signal vector r, a complex composition of the incident signal vector components. Preferably, each dot product of a row of T and r extracts the corresponding incident signal, while filtering out all others completely. This is equivalent to saying that the J rows of T form spatial passband filters, or beams, along corresponding angles of arrival $\phi$, while maintaining mutual nulls among them.

Enhanced digital beamforming on a communication satellite with a large antenna array requires substantial computational support from an on-board digital signal processing (DSP) subsystem. Orbit dynamics and the need for fast-moving or sticky beams can significantly increase the computational load. As a satellite progresses in its orbit, it may be desirable to maintain a beam at a specific spot on the surface of the earth. Desirably, this can be accomplished by adding suitable progressive phase increments to the angles (directions) associated with desired and undesired signals.

In a preferred embodiment, mutual wide nulls are achieved by replacing the original angles of arrival $\phi$ by dense clusters of such angles centered about the original ones. This forces multiple closely spaced nulls, and this attains effectively wider angular rejections around the original angles. Preferably, the clusters include three angles of arrival, the second of which would be identical to one of the original angles. Typically, the angular separation between consecutive cluster angles is a small fraction of an array's beamwidth, although the spacing need not be uniform. Desirably, using the set of all cluster angles as a legitimate set of angles of arrival, beams with wide mutual nulls are formed.

Wide nulls are achievable with one slight modification to the basic clustering approach. In a preferred embodiment, the first original angle of arrival, $\phi_1$, is combined with the clusters associated with all other original angles of arrival into one list of angles of arrival, $\psi$. Then, applying a standard DBF technique to this augmented list of angles of arrival produces one good beam in the original direction ($\phi_1$) because a cluster does not exist there. This is known as enhanced digital beamforming (EDBF). Repeating this process for each original angle of arrival systematically produces the required beams with wide mutual nulls.

Figure 4:
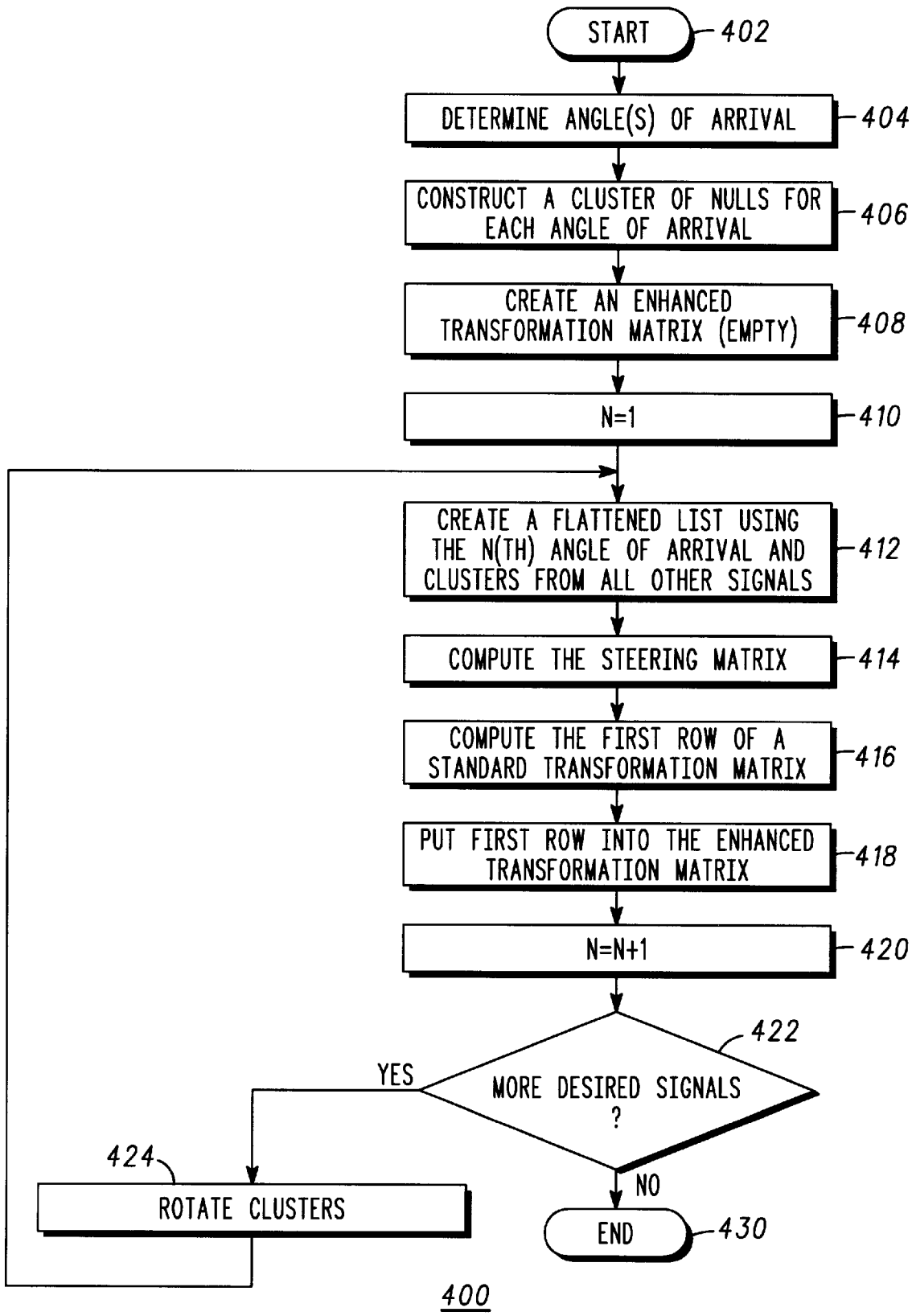
FIG. 4 illustrates a flow diagram of an enhanced digital beam forming (EDBF) procedure in accordance with a preferred embodiment of the invention.

FIG. 4 illustrates a flow diagram of an EDBF procedure in accordance with a preferred embodiment of the invention. Procedure 400 starts in step 402.

In step 404, angles of arrival are determined. The angles of arrival are described as:

$$\varphi = \{\varphi_j\}_{j=1}^J.$$

In step 406, a cluster of nulls is created for each angle of arrival. The clusters are described as:

$$\psi = \{\{\psi_{-I}^j, \ldots, \varphi_j, \ldots, \psi_I^j\}\}_{j=1}^J = \{\{\psi_i^j\}_{i=-I}^I\}_{j=1}^J = \{\psi^j\}_{j=1}^J.$$

In step 408, the enhanced transformation matrix is set to the empty list as shown below:

$$T_e = \{\ \}.$$

In step 410, a counting variable (N) is initialized to one. In step 412, a flattened list is created using the N(th) angle of arrival and the clusters of angles from all other signals. In other words, the first original angle of arrival is combined with all but the first cluster of angles as shown below:

$$\chi = \{\varphi_1, \psi_{-I}^2, \ldots, \varphi_2, \ldots, \psi_I^2, \ldots, \psi_{-I}^J, \ldots, \varphi_J, \ldots, \psi_I^J\} = \{\chi_l\}_{l=1}^L,$$

where L=(J-1) (2I-1)-1.
In step 414, the steering matrix is computed using:

$$A = \{\{\tau_l e^{i\pi k \cos \chi_l}\}_{k=1}^K\}_{l=1}^L.$$

In step 416, the first row of the standard transformation matrix is computed from the following:

$$T_s = (A^{*T}A)^{-1} A^{*T}.$$

In step 418, the first row is appended to the enhanced transformation matrix, $T_e$. In step 420, the counting variable N is incremented by one.

In step 422, a query is performed to determine if there are additional desired signals to be computed. When all the desired signals have been computed, then procedure 400 branches to step 430 and ends. In other words, if $\phi = \{\ \}$, return $T_e$ and end the procedure. When all the desired signals have not been computed, then procedure 400 branches to step 424.

In step 424, the clusters are rotated. Desirably, this means drop the first element of $\phi$ and rotate X to the left. After step 424, procedure 400 returns to step 412 and iterates as shown in FIG. 4.

As shown above, the enhanced transformation matrix $T_e$ begins as an empty list and is built up recursively one row at a time for each original angle of arrival in $\phi$. Desirably, for each loop through steps 412–424, the first row of the standard DBF matrix $T_s$ is appended to $T_e$, the leading element of φ is dropped, and the angle cluster list ψ is rotated to the left. Accordingly, when all of the elements in φ have been used, procedure 400 returns an enhanced transformation matrix, and the algorithmic procedure ends.

Figure 5:
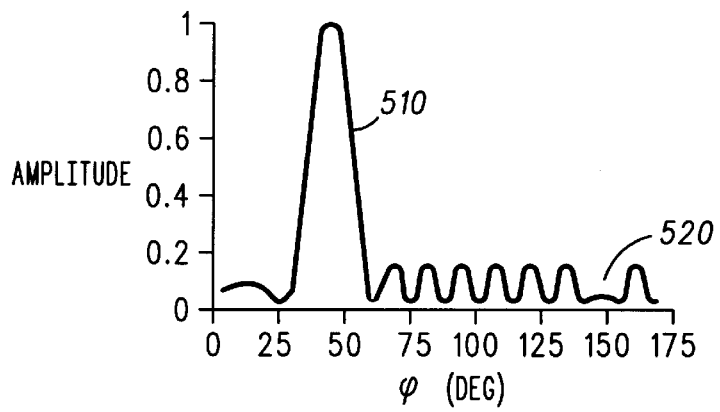
FIG. 5 shows a wide angle view of a beam and a cluster of nulls (wide null) produced using EDBF techniques.

FIG. 5 shows a wide angle view of a beam 510 and a cluster of nulls (wide null) 520 produced using EDBF techniques. Calculations have been performed using EDBF and standard DBF for a 16-element linear array and two angles of arrival. In this example, a desired beam (signal) 510 is at 45 degrees, and an undesired signal is at 135 degrees.

Figure 6:
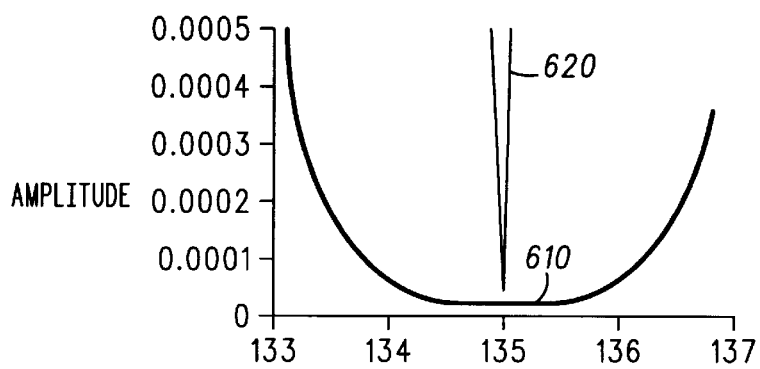
FIG. 6 shows a more detailed view of a region near the nulls in the antenna beam pattern in accordance with a preferred embodiment of the invention.

FIG. 6 shows a more detailed view of a region near the nulls in the antenna beam pattern in accordance with a preferred embodiment of the invention. In FIG. 6, a four degree segment (from FIG. 5) is shown to further illustrate the effectiveness of a wide null 610 obtained using the EDBF techniques of the invention. A narrow null 620 is shown for comparison. Narrow null 620 is a result of using standard DBF techniques. Narrow null 620, as shown, is effective only at a single angle. Narrow null 620 spans a small fraction of a degree; that is, it achieves a −60 decibel level at a single point. Wide null 610, which results from the EDBF technique, is several degrees wide; that is, it achieves a −60 decibel level over a wide range. Wide null 610 can be used more effectively to minimize interference caused by an undesired signal.

Additional calculations have been performed where the two pre-formed beams of the same 16-element array example have been scanned by 0.5 degree. The simulation results indicate that the wide nulls track the beams by the same amount of 0.5 degree. These results also show that enhanced digital beamforming offers a margin of performance over that of conventional scanable beams.

Digital beamforming has been formulated for a single frequency of operation, presumably the center frequency of a communication system's operational bandwidth. For narrowband systems, where the bandwidth B is a small fraction of the carrier frequency $f_c$, one could safely apply the DBF formulation at $f_c$ across the band, yielding very little performance degradation at the band edges. However, as the fractional bandwidth $B/f_c$ increases, the degradation manifests itself in increased null migration. This is an unfortunate phenomenon which tends to limit standard DBF performance for systems with large fractional bandwidths.

EDBF minimizes this degradation due to bandwidth. EDBF, by providing wide mutual nulls to mitigate interference, adds to the effectiveness of a satellite communication system. For larger bandwidths, channelization techniques can be used along with EDBF techniques. In this case, the operational band is divided into sufficiently small sub-bands to support acceptable EDBF performance.

Beam patterns formed by the enhanced digital beamforming algorithm apply equally well to receive and transmit operations, and they can be steered digitally as desired. If the extent of steering is confined to a fraction of a beamwidth, the wide nulls will all be steered accordingly, thus continuing to suppress undesired co-channel interference. This means that the T matrix for the enhanced digital beamformer does not have to be updated as often as the T matrix for the standard DBF.

The enhanced digital beamforming algorithm can also be used to produce combinations of narrow and wide mutual nulls or, more generally, mutual nulls of desired width. This flexibility also allows concurrent beams with different beamwidths and different null widths.

Figure 7:
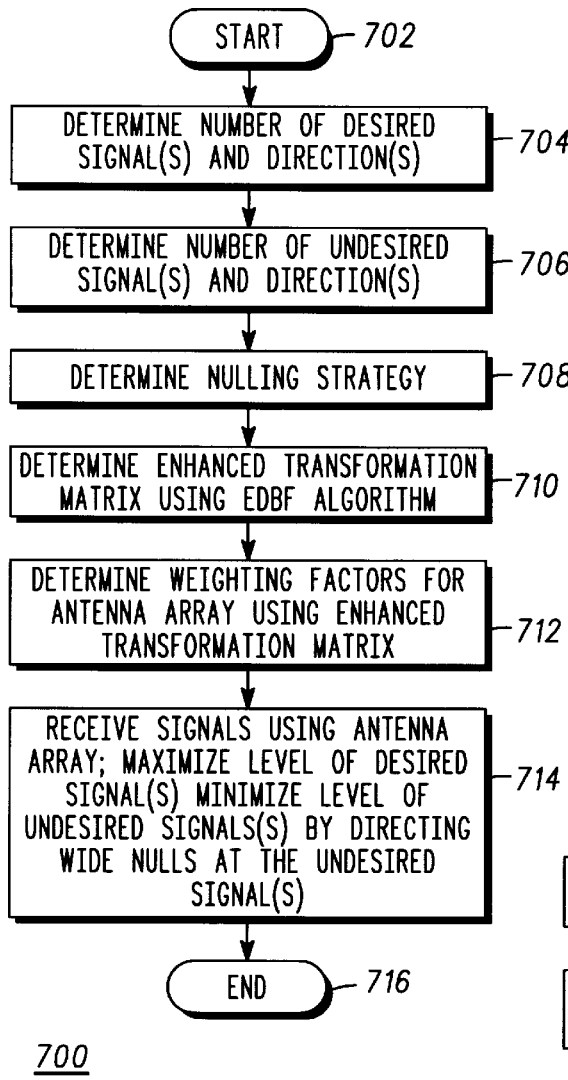
FIG. 7 illustrates a flow diagram of a procedure for using EDBF techniques in a receiver in accordance with a preferred embodiment of the invention.

FIG. 7 illustrates a flow diagram of a procedure for using EDBF techniques in a receiver in accordance with a preferred embodiment of the invention. Procedure 700 starts with step 702.

In step 704, the number of desired signals is identified, and a direction of arrival is determined for each one of the desired signals. In some cases, a single desired signal is considered. In other cases, many desired signals are considered.

In step 706, a number of undesired signals are identified, and a direction of arrival is determined for each one of these undesired signals. In some cases, a single undesired signal is considered. In other cases, many undesired signals are considered.

The enhanced digital beamforming algorithm disclosed herein requires direction of arrival information to function effectively. In a preferred embodiment, a GPS-aided location system is used to derive the directions of arrival. In an alternate embodiment, angle of arrival information can be furnished by a direction finding subsystem which uses part or all the existing array to pinpoint directions of incident sources. In a preferred embodiment, angles of arrival are determined in two dimensions. In an alternate embodiment, angles of arrival are determined in three dimensions.

In step 708, a nulling strategy is determined for the receive mode. The nulling strategy involves characterizing wide nulls. Wide nulls comprise clusters of nulls. A coverage range is established. The coverage range determines the width for the wide null. The coverage range can be different for each undesired signal.

In addition, the number of narrow nulls used to established the wide null is also determined. In a preferred embodiment, the minimum number of narrow nulls within a cluster is three. In some cases, each undesired signal has a wide null associated with it. In other cases, some of the undesired signals do not have wide nulls associated with them.

In some embodiments, quantization is an issue of concern when developing a nulling strategy. The number of beams and their relative position can also be factors in a nulling strategy.

The nulling strategy can also be affected by the number of unknown interfering signal sources. If one direction or interfering source is omitted or unknown, the enhanced digital beamformer does not establish an undesired signal for that direction. In this case, the EDBF does not exhibit nulls in that direction in its other beam patterns. This can occur when a competing system contributes one or more incident signals which are unknown and ignored by the beamformer. In a preferred embodiment, the EDBF forms nulls in the direction of these foreign sources, as their directions become known. In alternate embodiments, nulls can be widened to cover suspected interfering signals.

In step 710, an enhanced transformation matrix is determined using the procedure presented in FIG. 4. In step 712, weighting factors for the antenna array are determined. The weighting factors are determined from the enhanced transformation matrix.

In step 714, desired and undesired signals are received and processed by a receiver. The level for the desired signal is maximized, and the level for at least one of the undesired signals is minimized using wide nulls. Procedure 700 ends in step 716.

Figure 8:
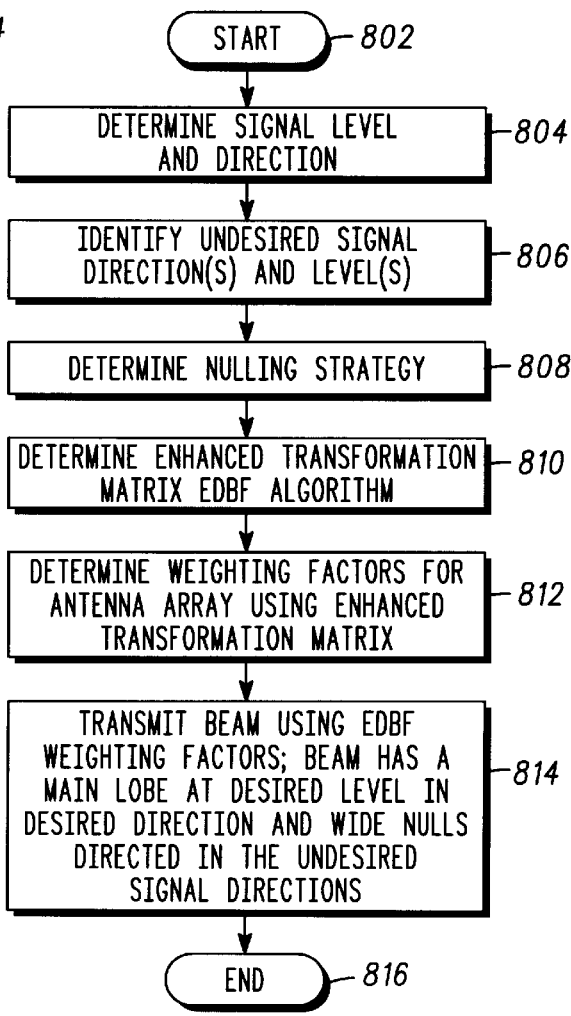
FIG. 8 illustrates a flow diagram of a procedure for using EDBF techniques in a transmitter in accordance with a preferred embodiment of the invention.

FIG. 8 illustrates a flow diagram of a procedure for using EDBF techniques in a transmitter in accordance with a preferred embodiment of the invention. Procedure 800 starts with step 802.

In step 804, a signal level and a direction is determined for a number of desired signals. In some cases, a single beam is used. In other cases, many beams are required to support many desired signals.

In step 806, a signal level and a direction is determined for a number of undesired signals. A transmission direction is determined for each one of these undesired signals. In the case of a transmitter, undesired signals represent known receivers that are adversely affected by this signal. A signal level is also determined which establishes an acceptable level of interference at these known receivers. In some cases, a single undesired signal is considered. In other cases, many undesired signals are considered.

The enhanced digital beamforming algorithm disclosed herein also requires direction for transmission information to function effectively. In a preferred embodiment, a GPS-aided location system is used to derive the directions for transmission. In an alternate embodiment, angle for transmission information can be furnished by a terrestrial-based subsystem.

In a preferred embodiment, angles for transmission are determined in two dimensions. In an alternate embodiment, angles for transmission can be determined in three dimensions.

In step 808, a nulling strategy is established. The nulling strategy involves characterizing wide nulls. Wide nulls comprise clusters of nulls. A coverage range is established for each undesired signal. The coverage range determines a width for each wide null. The coverage range can be different for each undesired signal. The coverage range can also vary based on the relative position of a transmitter. For example, the coverage range for wide nulls on a space based transmitter varies as its relative position changes.

In addition, the number of narrow nulls used to established each wide null is also determined. In a preferred embodiment, the minimum number of narrow nulls within a cluster is three. In some cases, each undesired signal has a wide null associated with it. In other cases, some of the undesired signals do not have wide nulls associated with them.

In some embodiments, quantization is an issue of concern when developing a nulling strategy for a transmitter. The number of beams and their relative position can also be factors in a nulling strategy.

The nulling strategy can also be affected by attempting to present nulls to receivers at imprecise locations. If a direction for a receiver is unknown, the enhanced digital beamformer does not form a wide null in that direction. This can occur when more than one system tries to share spectrum. In a preferred embodiment, the EDBF does not form nulls in the direction of these unidentified receivers because their precise directions are not known. In alternate embodiments, nulls can be widened to cover suspected areas.

In step 810, an enhanced transformation matrix is determined using the EDBF procedure presented in FIG. 4 with angles of transmission substituted for angles of arrival. In step 812, weighting factors for the antenna array are determined. The weighting factors are determined from the enhanced transformation matrix.

In step 814, main beams are transmitted in the desired directions and wide nulls are directed at undesired signal receivers. The level for the signal transmitted in the desired signal direction is maximized, and the signal level transmitted in at least one of the undesired signal directions is minimized using the wide nulls. Procedure 800 ends in step 816.

Lower spectral efficiency can be found in current systems because, among other reasons, greater separation is needed among the beams to ensure sufficient isolation. Enhanced digital beamforming techniques used in the invention are effective in increasing the isolation among the beams because of the wide mutual nulls. In a preferred embodiment of the present invention, co-channel beams are positioned closer because of the strength of the added isolation provided by the wide mutual nulls.

Enhanced digital beamforming is essentially an open-loop concept. A necessary input to the beamformer is the set of desired look directions toward which beams are to be formed. So, if these directions are not exactly correct, the beams will point away from the actual sources accordingly. More significantly, the mutual nulls will be shifted from their ideal locations, degrading the overall performance. Antenna patterns established using enhanced digital beamforming techniques are more tolerant of inaccuracies due to the wider nulls.

These antenna patterns have the ability to reject interfering signals in the presence of pointing errors and other inaccuracies. The amount of interference rejection is based on the extent of the coverage range for the null and the number of narrow nulls provided within the coverage range. The coverage range and number of nulls are changed to establish wide nulls in the beam pattern, and these wide nulls are positioned in the direction of the interfering signals.

The enhanced digital beam forming calculations are done as required. The update rate is dependent on a number of factors including changes in satellite position relative to the desired and undesired transmitters and receivers. For example, if the rate of change of the elevation angle is 0.0569°/sec, then this corresponds to 0.005°/frame, assuming a frame length of 90 msec. When a correction of the beamformer is required every 0.5°, then AOA information needs to be updated every 100th frame. This can be done using digital signal processors. However, these calculations are merely for forming the transformation matrix T. To form the beams, this transformation must be performed on the data. This operation is simpler than computing the linear transformation, but it dominates the processing rate requirements because it must be done much more frequently. In a preferred embodiment, this processing rate is achieved using special parallel processors. This is true regardless of the method or criteria used for extracting the linear transformation for EDBF.

In an alternate embodiment, the processor uses logarithmic number system (LNS) arithmetic. LNS-based arithmetic provides an advantage because multiplication operations can be accomplished with adders instead of multipliers. Digital adder circuits tend to be much smaller than comparable multiplier circuits. Thus, the size of the beam forming processor array can be reduced by incorporating LNS-based computing units.

An LNS-based processor can include log converters, summing circuits, weighting circuits, and inverse-log ($\log^{-1}$) converters. The log converter and inverse-log converter can be implemented using any of the converters described in the co-pending U.S. patent applications of the above-identified Related Inventions Nos. 1–4.

The enhanced digital beamforming algorithms can be used with or without antenna aperture taper, and the beam resolution can vary depending on the taper. Typically, a deployable antenna array has aperture taper to control and maintain a sufficiently low sidelobe structure, at the expense of a commensurate amount of beam broadening. Aperture taper is used in conventional array design as a measure against unforeseen sidelobe interference.

In a preferred embodiment, aperture taper is used along with enhanced digital beamforming. Simulations have shown that except for slightly broader beams and lower sidelobe structure, aperture taper has little detrimental effect on enhanced digital beamforming. In alternate embodiments, various aperture taper techniques may be combined advantageously with an enhanced digital beamformer.

The method and apparatus of the present invention enable the capabilities of a satellite communication system to be greatly enhanced by using antenna patterns with wide nulls. Using wide nulls to minimize the effect of interfering signals can be optimized for various missions, and additional cost benefits can be accrued by the system using the method and apparatus of the invention.

The invention has been described above with reference to a preferred embodiment. However, those skilled in the art will recognize that changes and modifications can be made in this embodiment without departing from the scope of the invention. For example, while a preferred embodiment has been described in terms of using a specific block diagram for the beamformer, other systems can be envisioned which use different block diagrams. Accordingly, these and other changes and modifications which are obvious to those skilled in the art are intended to be included within the scope of the invention.

What is claimed is:

1. A method of operating a satellite for mitigating interference from K undesired signals, wherein K is an integer, said method comprising the steps of:

identifying a first number of desired signals for reception by said satellite;

determining a beam direction for one of said first number of desired signals;

tracking said beam direction as said satellite moves;

identifying a second number of undesired signals within said satellite's field of view (FOV), said second number of undesired signals including said K undesired signals;

determining a null direction for at least one of said K undesired signals;

tracking said null direction as said satellite moves; and mitigating said interference from said at least one of said K undesired signals by providing at least one wide null directed at said at least one of said K undesired signals, said at least one wide null comprising a third number of nulls that is periodically redirected as said satellite moves, wherein said third number of nulls are determined using an enhanced digital beam forming (EDBF) algorithm and an enhanced transformation matrix, said EDBF algorithm further comprising the steps of:

a) creating an enhanced transformation matrix, said enhanced transformation matrix being initially empty;

b) determining N beam directions identifying angles of arrival for N desired signals within said first number of desired signals;

c) identifying a J(th) beam direction, said J(th) beam direction identifying an angle of arrival for a J(th) desired signal within N desired signals;

d) determining K null directions identifying angles of arrival for said K undesired signals within said second number of undesired signals;

e) constructing K sets of angles, a set of angles being constructed for a null direction;

f) constructing a list by combining said angle of arrival for said J(th) beam direction with said K sets of angles;

g) computing a steering matrix using said list;

h) calculating a standard transformation matrix using said steering matrix;

i) appending a first row of said standard transformation matrix to said enhanced transformation matrix;

j) discarding said J(th) beam direction;

k) rotating said list in a left direction;

l) incrementing J;

m) returning to step c) and repeating steps c) through m), when J is not greater than N; and n) ending when J is greater than N.

2. The method as claimed in claim 1, wherein said method includes the step of operating said satellite to mitigate interference at a terrestrial-based interfering signal receiver, said step further comprises the steps of:

identifying a transmit signal for transmission by said satellite;

determining a beam direction for said transmit signal;

identifying said terrestrial-based interfering signal receiver;

determining a null direction for said terrestrial-based interfering signal receiver; and mitigating interference at said terrestrial-based interfering signal receiver by providing at least one wide null directed at said terrestrial-based interfering signal receiver.

3. The method as claimed in claim 1, wherein said mitigating step further comprises the step of:

determining said beam direction and said null direction using angles of arrival in two dimensions.

4. The method as claimed in claim 1, wherein said mitigating step further comprises the step of:

determining said beam direction and said null direction using angles of arrival in three dimensions.

5. The method as claimed in claim 1, wherein step e) further comprises the step of:

locating said set of angles symmetrically about said null direction within a coverage range.

6. The method as claimed in claim 1, wherein step e) further comprises the step of:

locating said set of angles randomly about said null direction within a coverage range.

7. A method of operating a transmitter to mitigate interference using an enhanced digital beamformer adapted for use with an array antenna, said array antenna having a plurality of radiating elements for providing a plurality of steerable antenna beam patterns, said enhanced digital beamformer providing at least one control matrix for controlling said plurality of steerable antenna beam patterns, said method comprising the steps of:

transmitting at least one steerable beam pattern, said at least one steerable beam pattern including at least one beam at a first level in a desired signal direction and a plurality of undesired signals, wherein said plurality of undesired signals determine an interference level;

reducing said interference level using said enhanced digital beamformer and said at least one control matrix, wherein a first original angle of arrival associated with said desired signal direction is combined with a set of nulls associated with original angles of arrival of said plurality of undesired signals to produce a list of angles of arrival;

adjusting said at least one control matrix to increase said first level; and re-adjusting said at least one control matrix to provide at least one set of nulls, wherein said at least one set of nulls reduces said interference level, wherein said re-adjusting step further comprises the steps of:

a) identifying a first beam direction, said first beam direction identifying an angle for transmission of said at least one beam;

b) determining a number of directions, said directions identifying angles of transmission for said plurality of undesired signals;

c) constructing a first set of angles for said first beam direction wherein said first set of angles is centered about said first beam direction;

d) constructing sets of angles for said number of directions, wherein said sets of angles are centered about said number of directions;

e) constructing a list by combining said angle for transmission for said first beam direction with said sets of angles for said number of directions, said list not including said first set of angles;

f) computing a steering matrix using said list;

g) calculating a transformation matrix using said steering matrix;

h) appending a first row of said transformation matrix to an enhanced transformation matrix;

i) dropping said first beam direction;

j) rotating said list in a left direction;

k) designating a next direction in said number of directions as said first beam direction;

l) returning to step a) and repeating a) through l), when said next direction is available; and m) ending when said next direction is not available.

8. The method as claimed in claim 7, wherein said method further comprises the step of:

repeating said adjusting step and said re-adjusting step a number of times in order to increase said first level.

9. The method as claimed in claim 7, wherein said method further comprises the step of:

repeating said adjusting step and said re-adjusting step a number of times in order to decrease said interference level.

* * * * *